Dec. 28, 1948.　　　　R. F. WILD ET AL　　　　2,457,792
ANTIHUNTING MOTOR CONTROL CIRCUIT
Filed June 21, 1946　　　　　　　　　　　3 Sheets-Sheet 1
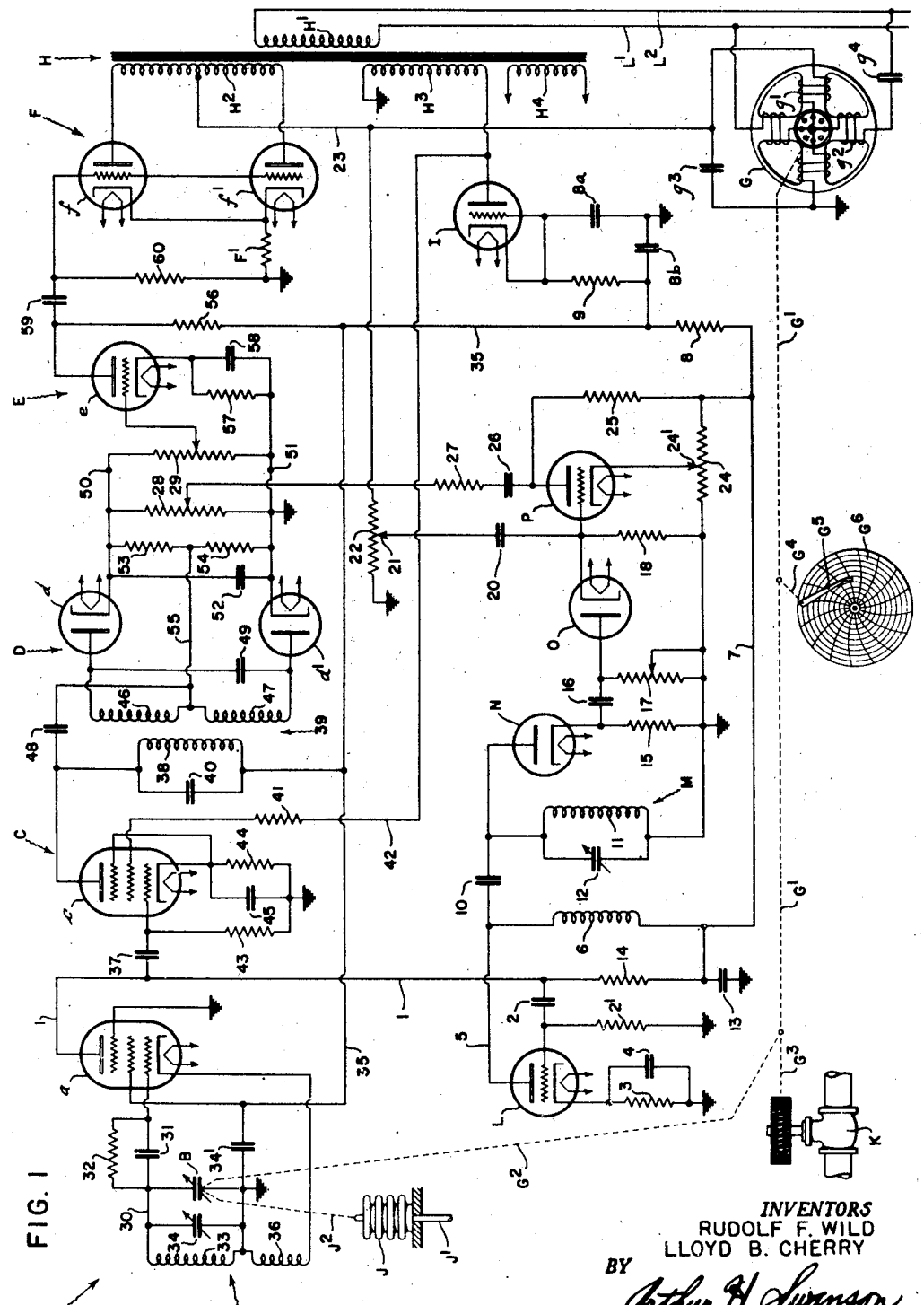
FIG. I
INVENTORS
RUDOLF F. WILD
LLOYD B. CHERRY
BY
Arthur H. Swanson
ATTORNEY.

Dec. 28, 1948.   R. F. WILD ET AL   2,457,792
ANTIHUNTING MOTOR CONTROL CIRCUIT
Filed June 21, 1946   3 Sheets-Sheet 2
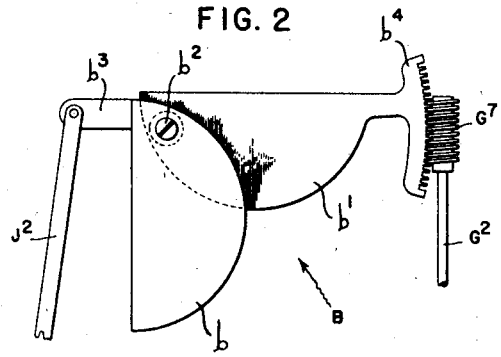
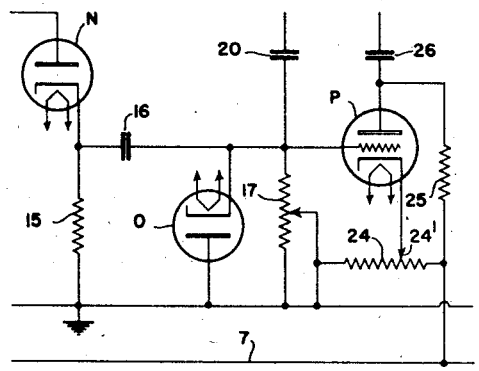
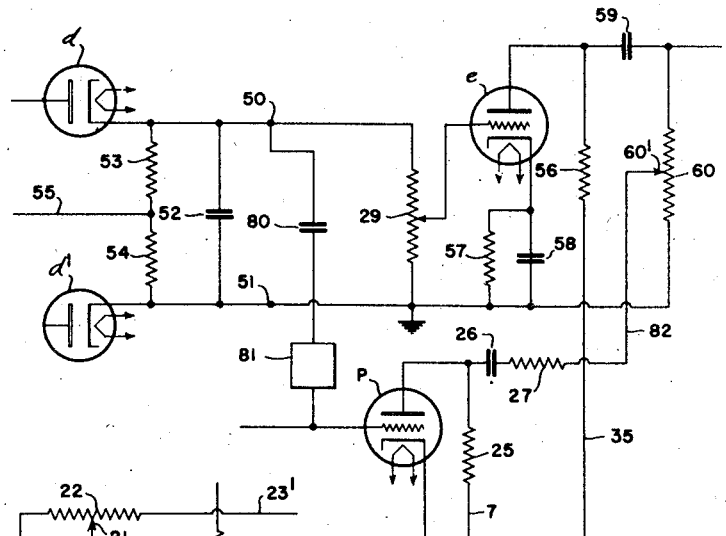
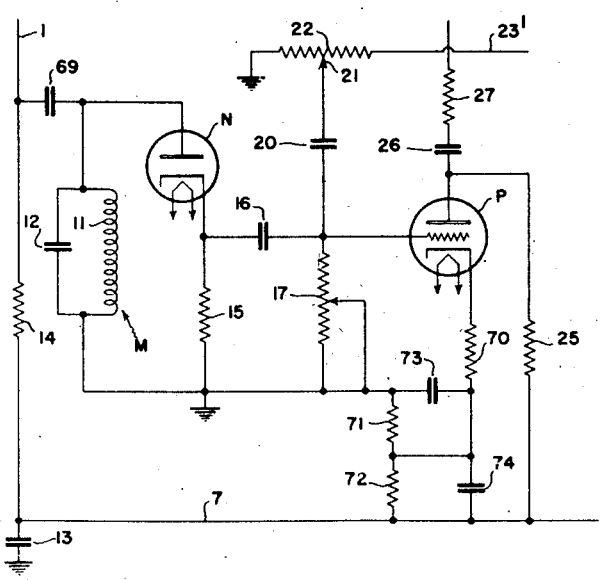
INVENTORS
RUDOLF F. WILD
LLOYD B. CHERRY
BY
ATTORNEY.

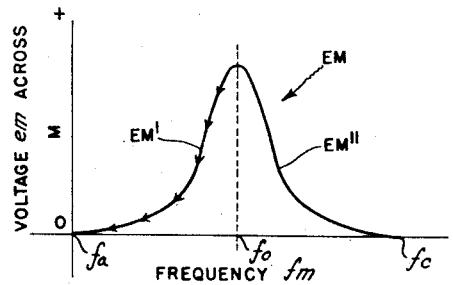
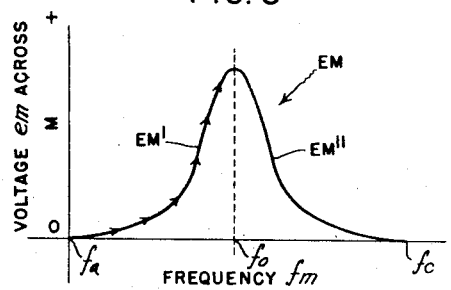
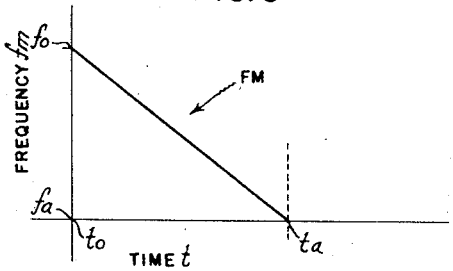
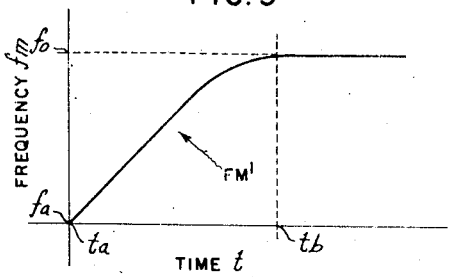
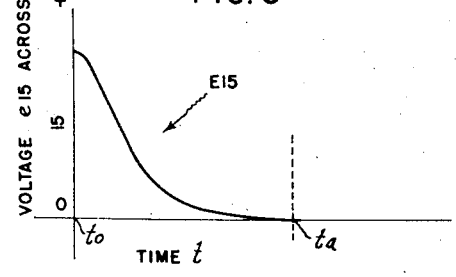
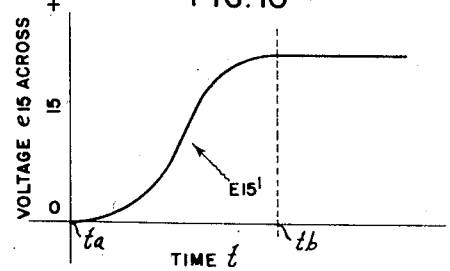
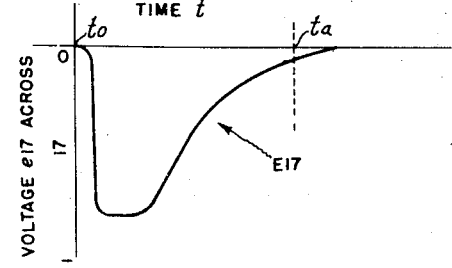
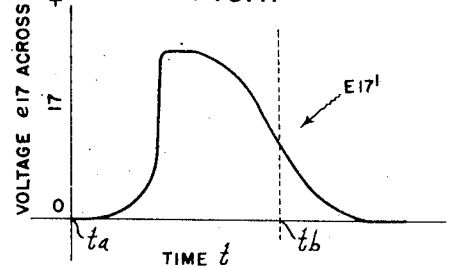

Patented Dec. 28, 1948

2,457,792

UNITED STATES PATENT OFFICE 2,457,792

ANTIHUNTING MOTOR CONTROL CIRCUIT

Rudolf F. Wild, Philadelphia, Pa., and Lloyd B. Cherry, Abilene, Tex., assignors to The Brown Instrument Company, Philadelphia, Pa., a corporation of Pennsylvania Application June 21, 1946, Serial No. 678,257

28 Claims. (Cl. 318—28)

The present invention relates to self-balancing electrical measuring and control systems of the type including a reversible rebalancing motor and an electronic amplifying and motor drive circuit network or section through which the motor is operated, when said system is unbalanced, in the direction and to the extent required to rebalance the system. One well known form of such a system is embodied in an extensively used self-balancing potentiometer instrument made by The Brown Instrument Company, the general principles and characteristics of which are fully disclosed in the application of Wills, Serial No. 421,173, filed December 1, 1943 which issued as Patent No. 2,423,540 on July 8, 1947.

That instrument comprises a potentiometric measuring circuit to which a thermocouple or other source of a small voltage to be measured is connected. The circuit includes a slide wire resistance normally adjusted to balance the circuit so that any change in the voltage being measured will unbalance the circuit. The instrument includes means through which measuring circuit unbalance impresses on the electronic amplifying and motor drive section of the instrument an alternating current motor drive or control signal of a magnitude proportional to the extent of unbalance. The frequency of the signal is the same as that of the source of alternating current employed to energize the system, usually 60 cycles per second, and the signal is substantially in phase, or 180° out of phase, with the voltage of said source, accordingly as the system is unbalanced in one direction or the other. The electronic network controls the operation of a two phase reversible motor which is actuated to an extent and in a direction depending on the magnitude and phase of the control signal, and is thereby caused to effect a potentiometer slide wire adjustment which rebalances the measuring circuit.

The electronic voltage amplifying and motor drive network disclosed in said Wills application is of a type well adapted for use in self-balancing systems quite different from the potentiometric measuring and control system disclosed in said application. That network is included, for example, in the self-balancing, measuring and control system disclosed in an application, Serial No. 537,505, filed May 26, 1944, by Rudolf F. Wild, one of the applicants herein. The last mentioned system includes an oscillator for producing oscillatory currents having the high frequencies commonly called radio frequencies. Thus, for example, the oscillating current created when the system is in balance may have a frequency of 450,000 cycles per second. When the system is unbalanced, the oscillation frequency will be more or less than 450 kc. per second, depending on the direction of unbalance.

The oscillating circuit shown in the Wild application includes inductance and capacity connected in parallel and proportioned to be resonant for current flow in the band of frequencies employed. In response to a change in a controlling condition, the circuit is given a detuning adjustment which increases or decreases the oscillation frequency, depending on the direction of the change.

The system includes a frequency discriminator through which when the system is unbalanced by a detuning adjustment, a motor drive or control signal is impressed on the voltage amplifying and motor drive circuit network of the system, whereupon the rebalancing motor of the system is set into operation to effect a retuning adjustment which neutralizes the previous detuning adjustment, and restores the normal inductance-capacity ratio, and thereby restores the original frequency and rebalances the system.

For optimum results with a self-balancing system operating at extremely high speeds and including a voltage amplifying and motor drive circuit network or section like, or analogous to, those disclosed in the above mentioned prior applications, the rebalancing motor must be subjected, in the final portion of each rebalancing operation, to a damping or braking action which the apparatus shown in said applications cannot give without additional provisions.

The general object of the present invention is to provide a system of the general type mentioned above, with novel motor damping provisions of such character that they subject the motor to substantially no speed reducing effect until balance is almost reached, and then brake the motor sharply so as then to substantially reduce its speed or even momentarily bring it to a stop, and thereafter permit the motor to move slowly into its fully balanced position. This permits the system to have full sensitivity when fully balanced, so as to prevent the occurrence of a so-called dead spot or dead zone condition of the apparatus.

A primary object of the invention is to provide a self-balancing system of the above mentioned general type with means operative, as the system closely approaches balance in each rebalancing operation, to derive a damping signal of opposite phase from the motor drive signal, and to feed the damping signal into the electronic amplifying and motor drive section of the system. The damping signal so fed into said section momentarily slows down, or even stops, the rebalancing motor and thus eliminates risk of motor overtravel.

A more specific object of the invention is to provide means for so deriving the damping signal and feeding it into the electronic amplifying and motor drive section, that the damping signal will decay or fade away as the motor is slowed down by the damping action and thus permit the motor to fully complete the balancing operation, and permit the system full sensitivity, following attainment of complete balance, to respond to any newly developed system unbalance.

Another specific object of the invention is to provide self-balancing systems including oscillating provisions of the general character disclosed in said prior Wild application, with simple and effective balance anticipating means responsive to variations in the frequency of the oscillating currents created by the oscillator section of the system, and adapted, as balance is closely approached in each rebalancing operation, to activate or make operative, means for deriving a motor damping signal and feeding it into the electronic amplifying and motor drive section as hereinbefore described.

The various features of novelty which characterize our invention are pointed out with particularity in the claims annexed to, and forming a part of this specification. For a better understanding of the invention, however, its advantages, and specific objects attained by its use, reference should be had to the accompanying drawings and description matter in which we have illustrated and described preferred embodiments of the invention.

Of the drawings:

Fig. 1 is a circuit diagram illustrating one form of the invention;

Fig. 2 is a view illustrating the form of an adjustable condenser mechanism shown diagrammatically in Fig. 1;

Fig. 3 is a diagram illustrating a modified form of the differentiating network shown in Fig. 1;

Figs. 4–7 are curves showing typical relationships between certain quantities for a departure from balance of the apparatus of Fig. 1;

Fig. 5–11 are curves similar to those of Figs. 4–7 showing typical relationships between certain quantities for an approach to balance of the apparatus of Fig. 1;

Fig. 12 is a circuit diagram illustrating a modification of the form of the invention shown in Fig. 1; and Fig. 13 is a circuit diagram illustrating a modification of Fig. 1 in respect to the manner of deriving a damping signal.

In Fig. 1 we have illustrated the use of a desirable form of the present invention in a measuring and control system sometimes referred to as a torque amplifying system, of the general type disclosed in the aforementioned Wild application. Said system comprises an oscillator portion A, which includes a pentode vacuum tube $a$ and a tuned, resonant circuit A'. The circuit A' includes a variable condenser or capacitor element B, by means of which the circuit A' and hence the oscillator A can be tuned to various frequencies. As is hereinafter more fully explained, the circuit A' and oscillator A have what we call a normal or center frequency of oscillation $f_0$, at which frequency the system is balanced. This normal frequency $f_0$ may well be, and is herein assumed to be 450 kc. The frequency of the oscillator A is increased above or decreased below the normal frequency $f_0$, and the system thereby unbalanced, by detuning adjustments of the condenser frequency $f_0$, and the system thereby unbalanced, by detuning adjustments of the condenser element B, which adjustments shift the resonant frequency of the tuned circuit A'. Similarly, the frequency of the circuit A' and oscillator A can be retuned to the normal value $f_0$, and the system thereby rebalanced, by appropriate retuning adjustments of the condenser B, which adjustments neutralize the effects of the detuning adjustments. Adjustments of the condenser B which cause the capacity of the latter to be increased result in decreases in the frequency of oscillation of the oscillator A and in decreases in the resonant frequency of the tuned circuit A'. Similarly, adjustments made to condenser B which decrease its capacity result in increases in oscillation frequency and in increases in the resonant frequency of the circuit A'.

The oscillator A has an output circuit including a conductor $l$ connected to the anode of the tube $a$, through which an oscillating control signal is impressed on the input circuit of a modulator keying stage C including a pentode valve $c$. In the stage C, the radio frequency signal received from the oscillator A, is modulated or keyed at the relatively low frequency of the alternating current supplied by the conductors L' and $L^2$. The latter supply alternating current to the system at the frequency, assumed herein to be 60 cycles per second, at which current is commonly supplied by commercial power lines.

The control signal is amplified and modulated by the tube $c$ and is impressed on the input circuit of a frequency discriminator D shown as comprising diodes $d$ and $d'$. When the system is unbalanced, the discriminator impresses a low frequency signal, i. e., a 60 cycle per second signal, on the input circuit of a voltage amplifier section E. The latter, as shown, comprises a triode $e$, on the control grid of which the signal received from the discriminator D is impressed. The output circuit of the voltage amplifier E impresses a motor drive signal on the control grids of the triode vacuum tubes $f$ and $f'$ of a motor drive unit F. The output circuit of that unit includes a control winding $g'$ of a two-phase rebalancing motor G. A power winding $g^2$ of the motor G is connected across the alternating current supply conductors L' and $L^2$, in series with a condenser $g^4$.

As shown, the conductors L' and $L^2$ supply alternating current to the primary winding H' of a transformer H which has three secondary windings $H^2$, $H^3$ and $H^4$. The secondary winding $H^2$ has one end terminal connected to the anode of the triode $f$ and has its other end terminal connected to the anode of the triode $f'$. The cathodes of the triodes $f$ and $f'$ are connected to ground through a resistance $F^1$, and the center-tap of the transformer secondary winding $H^2$ is connected to ground through the motor winding $g'$ and a condenser $g^3$ in parallel with said winding. The motor winding $g^2$ is connected to the supply conductors L' and $L^2$ in series with the condenser $g^4$ as previously explained. The value of the condenser $g^4$ is chosen so that this condenser together with the motor power winding $g^2$ forms a series resonant circuit when the winding $g^2$ is energized, hence the current flow in the winding $g^2$ will be substantially in phase with the alternating voltage across the supply conductors L' and L². As will be explained hereinafter, the motor drive current flowing through the winding g' will lead or lag the supply voltage and the current in the power winding g² by approximately 90°, accordingly as the signal impressed on the control grid of the voltage amplifier E is approximately in phase, or 180° out of phase with the supply voltage.

The transformer secondary winding H³ has one terminal connected to ground and has its other terminal connected to the anode of a half-wave rectifier tube I, shown as a triode with its control grid connected to its cathode so that the valve operates as a diode. The rectifier tube I supplies direct current to the anodes of the tubes $a$, $c$, $e$ and others hereinafter mentioned, through circuit connections hereinafter described. The transformer secondary winding H⁴ supplies heating current to the cathode heaters of the various valves through circuit connections not illustrated in order to avoid unnecessary complication of the drawings.

In the operation of the measuring and control system shown in Fig. 1, a detuning adjustment of the condenser B is effected by a device J on a change in a control condition to which the device J is responsive. The device J, as shown by way of illustration or example, is a bellows to which a controlling fluid pressure is transmitted by a pipe J'. The movable end of the bellows J is connected by means diagrammatically shown as a mechanical linkage J² to the condenser unit B. In normal operation, each adjustment given the condenser B by the device J is a detuning adjustment which unbalances the measuring and control system and results in an operation of the motor G, by which the latter operates, through rotating shaft connections G' and G², to give the condenser unit B a retuning adjustment. That adjustment neutralizes the previous detuning adjustment given the condenser by the device J, and thereby restores the normal, balanced condition of the system.

As diagrammatically shown, the operation of the motor G gives control adjustments through the shaft G' and an extension G³ thereof, to a control device K, shown as a valve. The adjustments of the latter may serve the purpose of normally maintaining the control quantity, to which the device J is responsive, at a predetermined normal value. Alternatively, the condition to which the device J responds may be an independent variable over which the measuring and control system has no control, and in such case, the control device K may be used to proportion the value of some dependent variable to the value of the independent variable. As diagrammatically shown in Fig. 1, the motor G also operates through the shaft G' and a suitable connection G⁴ to adjust an exhibiting element G⁵ into positions varying with, and corresponding to the varying values of the quantity to which the device J responds. The element G⁵ may be a simple indicating pointer, or, as shown, it may be a pen arm recording device for recording the values of the controlling quantity on a suitable record chart G⁶.

The capacitor B of Fig. 1 may take various forms. In some cases it may consist of two separate variable condensers connected in parallel, to one of which detuning adjustments are given by the device J, while the other is given retuning adjustments by the motor G. In the construction somewhat diagrammatically illustrated in Fig. 2, however, the capacitor B is a single condenser comprising two parallel spaced-apart blades $b$ and $b'$ pivoted to turn about a common axis $b²$, and electrically insulated from one another. As diagrammatically shown, the blade $b$ is connected through an arm $b³$ to the mechanical linkage J² of the device J. The blade $b'$ is connected through a gear segment $b⁴$ and worm G⁷ to the motor shaft extension G² so that the rotation of the motor G in one direction will turn the blade $b'$ in the clockwise direction, and rotation of the motor in the opposite direction will turn the blade $b'$ counter-clockwise. Normally, the blades $b$ and $b'$ partially overlap in such fashion that the capacity of the condenser B will be increased by a clockwise adjustment of the blade $b'$, and will be decreased by a counter-clockwise adjustment of that blade. Conversely, a clockwise or counter-clockwise adjustment of the blade $b$, will respectively decrease or increase the capacity of the condenser B. As will be apparent, in normal operation, each adjustment of the blade $b$ which increases or decreases the capacity of the condenser B, is subsequently neutralized by a follow-up adjustment of the blade $b'$ effected by the motor G, which thus tends to maintain the capacity of the condenser B constant regardless of the value of the controlling condition, or of the actual angular position of the blade $b$.

Further and more detailed references to the circuit characteristics and operation of the system elements to which we have referred are made after the following description of the novel motor damping apparatus shown in Fig. 1. That apparatus includes an amplifying triode L having its input circuit coupled to the output circuit of the oscillator valve $a$ by a coupling condenser 2, which condenser has one terminal connected to the conductor 1, and has the other terminal connected to the control grid of the valve L. A grid resistance 2' is connected between the control grid of the valve L and ground. The cathode of the valve L is connected to ground through a resistance 3 and a condenser 4 in parallel with said resistance. The anode of the valve L is connected to the cathode of the rectifier valve I through a conductor 5, an inductance 6, a conductor 7, and resistances 8 and 9. More specifically, one end of the inductance 6 is connected to the anode of the valve L by the conductor 5, and the other end of the inductance 6 is connected by the conductor 7 and through the resistance 8 to one end of the resistance 9. The other end of the resistance 9 is connected to the cathode of the rectifier valve I. To smooth out ripples in the rectified current supplied by the valve I, a filter circuit is provided comprising the resistances 8 and 9, a condenser 8a connecting one end of the resistance 9 to ground and a condenser 8b connecting the other end of the resistance 9 to ground.

The anode of the valve L is also connected through the conductor 5 and a condenser 10 to one terminal of a tuned circuit element M which includes an inductance 11 and an adjustable condenser 12 in parallel with said inductance, and which has its second terminal connected to ground. The tuned circuit element M thus included in the output circuit of the valve L has the values of its inductance 11 and condenser 12 so proportioned that the element is tuned to resonate at the system balance frequency of 450 kc. The device M is therefore adapted to form an effective balance detector.

The voltage across the circuit element M is rectified by a diode N which has its anode connected to the ungrounded end of the element M and has its cathode connected to ground through a load resistance 15. The cathode of the diode N is coupled by a condenser 16 to the anode of a diode O and to one end of a resistance 17. The latter is shown as an adjustable resistance with its second end and slider contact connected to ground. The resistance 17 and condenser 16 form a differentiating network operative to produce a voltage surge or pulse across the resistance 17 on a rapid change in the voltage across the resistance 15.

As balance is approached there is a rapid increase in the voltage developed across the circuit element M. The resultant and correspondingly rapid increase in the unidirectional voltage developed across the resistance 15 operates through the differentiating network to create a sudden voltage surge or pulse of substantial amplitude across the resistance 17. The character of that voltage surge and the manner of its production are illustrated in Figs. 4 to 11, inclusive. In Fig. 4, distances measured along the horizontal line $fa$—$fc$ represent the oscillation frequencies $fm$ of voltages applied to the circuit element M, and the vertical distances from the line $fa$—$fc$ of points along the curve EM represent voltages $em$ developed across the circuit element M as the frequency $fm$ of the currents flowing through that element increases from a value $fa$, too low to cause the element M to resonate, through the balance frequency $fo$ at which the element M is resonant and the voltage $em$ is maximum, to a higher frequency $fc$, too high to cause the element M to resonate.

Fig. 5 illustrates, by means of curve FM, the relationship between the frequency $fm$ of the voltage $em$ and time $t$, during a typical period $to$—$ta$ of departure of the system from balance. Fig. 6 illustrates, by means of curve E15, the relationship between the voltage $e15$ across the resistance 15 and time $t$, during the time interval $to$—$ta$, and Fig. 7 illustrates, by means of curve E17, the relationship between the voltage $e17$ across the resistance 17 and time $t$, during the time interval $to$—$ta$. In Figs. 5, 6 and 7, distances measured along the horizontal lines $to$—$ta$ represent periods of time $t$, measured from the time $to$ at which time the system is balanced and the frequency $fm$ is $fo$.

In Fig. 5, the vertical distances from the line $to$—$ta$ of points along the curve FM represent the frequencies $fm$ of the voltage $em$, and also the identical frequencies of oscillation of the oscillator A, corresponding to the respective times $t$. In Fig. 6, the vertical distances from the line $to$—$ta$ of points along the curve E15 represent the voltages $e15$, with respect to ground, developed across the resistance 15 at the respective times $t$, and in Fig. 7, the vertical distances from the line $to$—$ta$ of points along the curve E17 represent the voltages $e17$, with respect to ground, developed across the resistance 17 at the respective times $t$.

During a typical period in which the system is subjected to an unbalancing action, due to a change in the frequency $fm$ of the oscillator A produced by a change in the magnitude of the quantity being measured by the element J and a resultant change in the capacity of the condenser B, let us assume that the frequency $fm$ and voltage $em$ change as shown by the portion EM' of the curve EM of Fig. 4, in the direction of the arrows. The manner in which the frequency $fm$ changes from its normal value $fo$ at time $to$ to the value $fa$ at time $ta$ may be assumed to be as shown by the curve FM of Fig. 5. In Fig. 4, as the frequency decreases from $fo$ to $fa$, the voltage $em$ decreases from its maximum value to practically zero. This causes the voltage $e15$ across the resistance 15 to fall from its maximum value at time $to$ to zero at time $ta$ as shown by the curve E15 of Fig. 6. Due to the differentiating action and the discharging of the condenser 16, the fall of the voltage $e15$ produces across the resistance 17 a pulse of voltage as shown by the curve E17 of Fig. 7. This voltage $e17$ is seen to be negative with respect to ground, and is prevented from actuating the motor damping circuit by means to be hereinafter described.

From the above it is seen that a change of frequency $fo$—$fa$ accompanying an unbalancing action of the system produces a pulse of negative voltage E17 across the resistance 17. If the unbalance occurs in the opposite direction, it will be accompanied by an increase in the frequency $fm$, as from $fo$ to $fc$ over the portion EM'' of the curve EM of Fig. 4, and the curve E17 then produced will be identical with the curve E17 illustrated in Fig. 7. This is shown to be the case by the curve EM of Fig. 4, wherein the respective portions EM' and EM'', above and below the normal frequency $fo$, respectively, are seen to be identical.

For a typical rebalancing action of the system, let us assume that the frequency $fm$ is returned from $fa$ at time $ta$ to $fo$ at time $tb$. This operation will be described with reference to the curves of Figs. 8–11, which are curves for a rebalancing operation and are similar to the respective curves of Figs. 4–7 for the unbalancing operation. In Fig. 8 is illustrated the curve EM of Fig. 4, with arrows illustrating the direction taken over the curve EM when the system is rebalanced. In Fig. 9 is shown a curve FM', corresponding to the curve FM of Fig. 5, but associated with system rebalance. In Fig. 10 is shown a curve E15', corresponding to the curve E15 of Fig. 6, but associated with system rebalance, and in Fig. 11 there is shown a curve E17' which corresponds to the curve E17 of Fig. 7 but is associated with system rebalance.

At the time $ta$, let us assume that the motor G starts to operate through the condenser B to change the frequency of the oscillator A and the frequency $fm$ of the voltage $em$ from the low value $fa$ at time $ta$ to its normal value $fo$ at time $tb$, as shown by the curve FM' of Fig. 9. The voltage $em$ and frequency $fm$ will then follow the portion EM' of the curve EM of Fig. 8 in the direction of the arrows as shown. As a result, the voltage $e15$ across the resistance 15 will increase as shown by the curve E15' of Fig. 10. This increase of the voltage $e15$ will be differentiated by the action of the charging of condenser 16, producing across the resistance 17 a positive pulse of voltage as shown by the curve E17' of Fig. 11. Since this voltage $e17$ is positive with respect to ground, it will actuate the motor damping circuit to be hereinafter described.

From the above it is seen that a change of frequency $fa$—$fo$ accompanying a rebalancing action of the system produces a pulse of positive voltage E17' across the resistance 17. If the rebalancing occurs after an unbalancing action in the opposite direction, it will be accompanied by a decrease in the frequency $fm$, as from $fc$ to $fo$ over the portion EM'' of the curve EM of Figs. 4 and 8, and the new curve E17' then produced will be identical with the curve E17' illustrated in Fig. 7, due to the aforementioned identity between the portions EM' and EM'' of the curve EM of Figs. 4 and 8. The curve FM' of Fig. 9 differs in shape from the curve FM of Fig. 5 due to the damping action applied to the motor G during the rebalancing operation, which action is not present in the unbalancing operation performed by the element J.

The exact form of the curves of Figs. 4 to 11 will depend upon the constants of the apparatus of Fig. 1. The curves shown by way of illustration, however, are typical, and serve to give an adequate representation of the operation of the system.

The diode O has its cathode connected to ground through a resistance 18 and has its anode connected to the junction between the resistance 17 and the condenser 16. The diode O acts selectively on differentiated pulses of voltage across the resistance 17, like those of Fig. 7 and 11, and passes to the control grid of a triode P only positive pulses like that shown in Fig. 11. The triode P is included in the feedback circuit through which a portion of the motor drive voltage is fed back into the voltage amplifier E. The control grid of the triode P is also connected through a coupling condenser 20, slider contact 21 and a potentiometer resistance 22 to a conductor 23 which connects the midpoint of the transformer secondary winding H² to the control winding g' of the motor G. The potentiometer resistance 22 is connected between the conductor 23 and ground. The control valve P is normally biased to cut-off by means of potentiometer resistance 24 to which the cathode of valve P is connected through a slider contact 24'. The resistance 24 has one end connected to the grounded end of the resistor 18, and has its second end connected to the conductor 7. The anode of the valve P is also connected to the conductor 7 through a resistor 25 and is thereby connected to the cathode of the rectifier tube I. The feed back circuit includes a coupling condenser 26 and an isolation resistor 27 through which the anode of valve P is connected to a variable intermediate point of a potentiometer resistance 28 which connects the cathodes of the diodes d and d' of the discriminator D. The potentiometer resistance 28 is connected in parallel with a second potentiometer resistance 29, to an adjustable intermediate point of which the control grid of the voltage amplifier valve e is connected.

In operation, when the measuring and control system is unbalanced by a detuning adjustment of the capacitor B, the resultant change in the frequency fm of the radio frequency oscillation signal current transmitted by the oscillator A to the valve L decreases the amplitude of the high frequency voltage em across resonant circuit M. When thereafter the retuning adjustment of the capacitor B effected by the motor G causes the system to again approach its balanced condition, the amplitude of the high frequency voltage em across the device M rapidly increases and thereby causes a rapid increase in the unidirectional voltage e15 across the resistor 15. This produces a positive pulse of voltage e17 across the resistor 17 due to the action of the differentiating network 16 and 17 as previously explained. This positive pulse passes through the diode O and appears across the resistance 18 and thereby appears as a positive pulse on the control grid of the valve P.

When the valve P is thus made conductive, it passes an amplified pulse of the motor drive voltage, transmitted from the conductor 23 through the resistance 22 and the condenser 20 to the control grid of the valve P, back into the discriminator output circuit through the feed back circuit. That circuit, as has been explained, includes the coupling condenser 26 and the isolation resistance 27 connecting the anode of the valve P and the resistance 28. The phase of the damping signal thus fed back to the discriminator output circuit and thereby to the input circuit of the voltage amplifier E, is such as to oppose the motor drive signal which the discriminator is then impressing on the valve e. The damping signal fed back may be large enough to instantly reduce the drive signal to zero, or may be even large enough to produce a reverse drive signal. This subjects the motor G to an instantaneous braking action and reduces the motor drive voltage appearing in the conductor 23 and also reduces the negative or opposing signal fed back to the discriminator. Simultaneously, the positive pulse applied to the control grid of the tube P decays, or fades away, as the condenser 16 becomes fully charged, so that tube P returns to its cut off condition. This allows the motor G to drive slowly into balance, and also insures full sensitivity at balance.

When the system is first unbalanced by a detuning adjustment of the condenser B, the high frequency signal voltage em across the resonant circuit M decreases rapidly, resulting in a negative pulse across the resistance 17 as shown in Fig. 7. This negative pulse, however, cannot pass through diode O, and therefore does not appear on the control grid of the tube P. This is an important feature, inasmuch as a strong negative pulse applied to the control grid of the tube P would diminish the effectiveness of a positive pulse occurring very shortly thereafter. While the diode O is shown in Fig. 1 as connected in series with the resistance 17 of the differentiating network, it can also be connected in parallel with said resistance as is shown in Fig. 3.

Appropriate capacities, resistances and inductances for the condensers, resistors and inductive windings utilized in the apparatus shown in Fig. 1 for generating radio frequency oscillations and for impressing appropriate motor drive signals on the electronic amplifying and motor drive apparatus shown in Fig. 1, are known to those skilled in the art and need not be stated herein. It is believed also that those skilled in the art will know how to select proper capacitances, resistances and inductances for the intended use of the apparatus shown in Fig. 1 for deriving and feeding into the electronic network braking signals in accordance with the present invention. However, by way of illustration and example, circuit element values which have been found appropriate for use in the apparatus shown in Fig. 1, are given in the following table:

| Condenser | Value |
| --- | --- |
| 2 | 500 micro-microfarads. |
| 4 | 0.01 microfarads. |
| 10 | 500 micro-microfarads. |
| 12 | 150 micro-microfarads (variable). |
| 13 | 30 microfarads. |
| 16 | 0.25 microfarads. |
| 20 | 0.05 microfarads. |
| 26 | 0.05 microfarads. |

| Resistance | Value |
| --- | --- |
| 2 | 500,000 ohms. |
| 3 | 2,000 ohms. |
| 14 | 20,000 ohms. |
| 15 | 1 megohm. |
| 17 | 1 megohm (variable). |
| 18 | 1 megohm. |
| 22 | 1 megohm (variable). |
| 24 | 10,000 ohms (variable). |
| 25 | 150,000 ohms. |
| 27 | 1 megohm. |

| Inductance | Value |
| --- | --- |
| 6 | 25 millihenries. |
| 11 | 1 millihenry. |

Returning now to a more detailed description of the system shown in Fig. 1, in which our novel motor damping mechanism is incorporated, we note first that the oscillator A is shown as an electron coupled oscillator. The pentode tube $a$ may be of the commercially available type 6SJ7. Its control grid is connected to a conductor 30 through a condenser 31 and its resistance shunt 32. The tuned parallel circuit A' which, as shown, includes the capacitor B, an inductance 33, and an adjustable condenser 34 is connected between the conductor 30 and ground. The latter condenser serves as a calibration or trimmer condenser fixing by its adjustment the particular pressure in the responsive element J at which the exhibiting element $G^5$ occupied its mid position, or some other predetermined position. The suppressor grid of valve $a$ is connected directly to ground. The screen grid of the valve $a$ is connected to ground through condenser 34', and is connected by conductor 35 to the junction of the resistors 8 and 9, and through the resistor 9 to the cathode of the rectifier I. As hereinafter explained, the conductor 35 is also connected to the radio frequency modulator or keying stage C and to the voltage amplifier E. The cathode of the valve $a$ is connected to ground through an inductance 36, inductively coupled to the inductance 33. The circuit inductively coupled by the inductance coils 33 and 36 produces high frequency oscillations in the oscillator A in the well known manner.

The oscillations produced in the oscillator A are transmitted through the output circuit conductor 1 of the valve $a$ to the control grid of the pentode $c$ of the frequency modulating or keying section C through a coupling condenser 37. The valve $c$ may be a 6SJ7 valve like the valve $a$. The anode of the valve $c$ has D. C. energizing voltage impressed on it from the rectifier tube I through the conductor 35 and the primary winding 38 of a transformer 39. A condenser 40 is connected in parallel with the winding 38. The suppressor grid of the valve $c$ is directly connected to the cathode of the valve. The screen grid of the valve $c$ is connected through a resistance 41 and conductor 42 to the terminal of the transformer secondary winding $H^3$ which is connected to the anode of the rectifier I. The control grid of the valve $c$ is connected not only to the coupling condenser 37, but also through the resistance 43 to ground. The cathode of the valve $c$ is connected to ground through a resistance 44 and a condenser 45 in parallel with said resistor.

With the described connections, the high frequency currents of variable frequency created by the oscillator A are impressed on the control grid of the valve $c$ and are amplified in that tube. Inasmuch as the energizing voltage for the screen grid of the valve $c$ is alternating, the valve $c$ is conductive and anode currents flow through it only during those half cycles of the voltage supplied by the transformer secondary winding $H^3$ in which said screen grid is positive with respect to its associated cathode and ground. Consequently, the amplified high frequency currents flowing through the transformer primary winding 38 in the plate circuit of the tube $c$ are modulated at the low frequency, assumed to be 60 cycles per second, of the alternating voltage between the supply conductors L' and $L^2$.

The transformer 39 has a split secondary winding, one-half of which is designated as 46 and the other half of which is designated as 47. The center-tap of the split secondary winding is connected by a blocking condenser 48 to the anode of the tube $c$. The opposite ends of the windings 46 and 47 are connected, respectively, to the anodes of the previously mentioned discriminator valves $d$ and $d'$. The anodes of those valves are also connected together through a condenser 49. The terminals 50 and 51 connected to the cathodes of valves $d$ and $d'$, respectively, are the terminals of the discriminator D and are connected together through a condenser 52. The terminals 50 and 51 of the discriminator D are also connected together through the previously mentioned parallel connected potentiometer resistances 28 and 29. A pair of equal resistances 53 and 54 connected in series with one another are connected in parallel with the resistances 28 and 29. The junction of the resistances 53 and 54 is connected to the midpoint of the split secondary winding of the transformer 39 by a conductor 55. The condensers 40 and 49 connected across the primary and secondary windings of the transformer 39, respectively, tune the latter to the normal or balance frequency of 450 kc. The blocking condenser 48 and the condenser 52 are selected to present low impedance to the high frequency oscillating currents flowing through them.

The voltage drops across the resistances 53 and 54 vary dissimilarly when the frequency of the currents flowing through the transformer primary winding 38 varies. Since the resistances 53 and 54 have equal values, the voltage drops therein will be equal when the frequency of the currents flowing through the transformer primary is the normal, or balance frequency of 450 kc. The voltage across the resistance 53 exceeds the voltage across the resistance 54 during periods in which the frequency of the currents flowing through the transformer winding 38 exceeds the balance frequency. Conversely, when the frequency of these currents is less than the balance frequency, the voltage across the resistance 53 is smaller than the voltage across the resistance 54.

Since the tube $c$ is conductive only during alternate half cycles of the supply voltage, there is no potential difference between the discriminator terminals 50 and 51 during the other half cycles. During the half cycles in which the tube $c$ is conductive and in which the system is unbalanced, there will be a potential difference between the terminals 50 and 51 unless and except as such difference should be eliminated by a braking signal injected into the resistance 28 of a magnitude exactly equal to said difference and of opposite phase. With the terminals 50 and 51 at the same potential during half cycles alternating with half cycles in which the terminals are at different potentials, those terminals are able to impress an alternating current signal of supply voltage frequency on the control grid of the valve e through the control grid connection to the resistance 29.

The phase and magnitude of the signal impressed on the valve e depends upon the relative values of the voltages across the resistances 53 and 54 and the damping signal impressed on the resistance 28 by the control valve P. One of those voltages is in phase and the other is 180° out of phase with the voltage across the supply conductors L' and L². The phase of the damping signal impressed on the resistance 28 is opposite to the phase of whichever of the voltages across the resistances 53 and 54 is the larger. When the system is substantially unbalanced so that there is no damping signal to be taken into account, the motor drive signal impressed on the valve e will be equal in magnitude to the resultant of the opposing voltages across the resistances 53 and 54 and of course is in phase with whichever of the two voltages is then the larger. The anode of the valve e is connected by a resistance 56 to the conductor 35 and thereby to the cathode of the rectifier I. The cathode of the valve e is connected to ground through a resistance 57 and a condenser 58 in parallel therewith. In operation, the resistance 57 and condenser 58 bias the control grid of the valve e so that the voltage of the control grid is maintained at a predetermined mean value when the fluctuating voltage output from the discriminator D is zero. This biasing circuit serves to provide proper biasing potentials, as required for good amplification of small descriminator output or signal voltages. For discriminator output voltages in excess of a predetermined amplitude, the valve e acts as a limiter due to anode current saturation and cut-off.

The anode of the valve e is connected by a coupling condenser 59 to the control grids of the two valves f and f' of the motor drive section F. The cathodes of those valves are both connected to ground through the resistance F''. The control grids of valves f and f' are grounded through a resistance 60. The power amplifier tube f and f' included in the motor drive section F, may, in practice, be included in a twin triode tube such as a type 7N7 tube. The condenser 59 is provided for impressing the fluctuating components of voltage produced across the resistance 56 in the anode circuit of the voltage amplifier valve e on the input circuit of the power amplifier or motor drive section F, while preventing the D. C. component of the anode circuit voltage of the amplifier valve e from being impressed on said input circuit. The signal from the voltage amplifier E is impressed simultaneously and equally on the control grids of the valves f and f'.

Anode voltage is supplied to the anodes of the motor drive valves f and f' by the split secondary winding H² of the transformer H, one end terminal of the split secondary winding H² being connected to the anode of the valve f, and the other end terminal being connected to the anode of the valve f'. The adjacent ends of the two halves of the split secondary H² are connected by the previously mentioned conductor 23 to the control winding g' of the motor G and through the latter to ground, and thence to the cathodes of the valves f and f' through the resistance F''.

The motor G may be like the rebalancing motors disclosed in the above mentioned prior Wills and Wild applications, comprising a stator having four spaced-apart pole pieces and a squirrel cage rotor. The motor power winding g² is wound around two opposing pole pieces of the stator, and the control winding g' is wound around the other two pole pieces. As previously explained, when the control winding g' is energized, the motor G rotates in one direction or the other, accordingly as the current flow through the winding g' leads or lags the current flowing in the power winding g². Whether the control winding current leads or lags the power winding current depends upon whether the signal impressed on the control grids of the valves f and f' is in phase with the power winding current and the supply voltage, or is 180° out of phase with that current and that voltage.

The fact that the phase of the signal impressed on the control grids of the valves f and f' controls the phase of the current flowing in the control winding g' results from the character of the plate voltages supplied to the valves f and f'. The transformer secondary winding H² is so wound and connected to the anodes of the valves f and f', that the anode of one of said valves is made positive during half cycles of the alternating current supply voltage which alternate with the remaining half cycles, during which the anode of the other valve is made positive. If it be assumed that the winding H² is formed and connected so that the voltage on the anode of the valve f increases and decreases in phase with the supply line voltage, then the voltage on the anode of the valve f' will increase and decrease 180° out of phase with the supply line voltage. This relation remains substantially unchanged under all conditions. In consequence, if the motor G rotates in the clockwise direction when the current in the control winding g' leads the power winding current by approximately 90°, the motor will rotate clockwise when the signal impressed by the amplifier E on the control grids of the valves f and f' is in phase with the supply voltage, and the motor will turn in a counterclockwise direction when said signal is 180° out of phase with the supply voltage. Clockwise rotation is produced when the control signal is in phase with the supply voltage because, on the assumptions made above, the control grid and anode of the valve f go positive in the same half cycle of the supply voltage. Conversely, when the control signal impressed on the valves f and f' is 180° out of phase with the supply voltage, the control grid and anode of the valve f' will be positive during the same half cycles of the supply voltage and the motor G will run in the counterclockwise direction.

When the system shown in Fig. 1 is operating with the normal or balance frequency of 450 kc., the amplifier E impresses no signal on the control grids of the valves f and f', and the voltage of the control grids of those valves then remains constant. Under those conditions, current flows from the anode to the cathode of the valve f during half cycles of the supply line voltage which alternate with the half cycles during which current flows between the anode and cathode of the valve f'. The currents then flowing alternately through the two valves, and thence through the control winding g' of the motor G, are of equal magnitude and neither subjects the motor rotor to a torque. The parallel circuit formed by the winding g' and condenser g³ is proportioned so as to be resonant under this condition, and consequently provides a high external impedance which is substantially resistive in character.

Accordingly, a pulsating voltage drop in phase with the anode currents flowing through the valves $f$ and $f'$, is produced across the control winding $g'$ by the flow of pulsating anode current through said parallel resonant circuit. The pulsating voltage across the control winding $g'$ produces a current flow through the winding which includes a D. C. component and an alternating component having a fundamental frequency of twice the frequency of the alternating current in the supply conductors L' and L², i. e. a frequency of 120 cycles per second.

Due to the inductance of the control winding $g'$, the 120 cycle current flow through this winding lags the voltage across the winding by substantially 90° of the 120 cycle voltage, or by 45° of the 60 cycle voltage. The condenser $g^3$ connected in parallel with the control winding $g'$ operates to maintain the D. C. component of the current flow through the control winding at a substantially steady value, and also provides a low impedance path for the 120 cycle component of the current flow in the control winding. Since the control winding has a low resistance, the D. C. component flowing therethrough is relatively great while the amplitude of the alternating current flowing through the control winding is relatively small because of the high inductance of the control winding. Due to the relatively high D. C. component of current through the control winding, the core structure tends to become saturated with the result that the inductive reactance of the control winding $g'$ is relatively small. The condenser $g^3$ is so selected with respect to this inductive reactance at 120 cycles that the condenser $g'$ in parallel to the control winding $g'$ provides a substantially parallel resonant circuit, as previously mentioned.

The relatively large D. C. current and 120 cycle current flowing through the control winding $g'$ under these conditions act to retard rotation of the motor rotor. Specifically, rotation of the rotor causes its conductor bars to cut flux produced by the D. C. and 120 cycle components of current flowing through the control winding $g'$ and this action creates a relatively heavy current through the conductor bars which quickly expends the force urging the rotor to rotation, and hence, provides an efficient through somewhat insufficient braking action.

It is noted that during the alternate half cycles of the 120 cycle voltage, the A. C. component of the current flowing through the control winding $g'$ has both a high peak and a low peak. The high peak and the low peak of each half cycle of the 120 cycle component cancel each other and therefore do not provide any turning effect on the motor. While the 120 cycle component of the current through the control winding does not create any tendency for the motor to rotate, this component of current acts, similarly to the D. C. current component, but to a lesser degree, to retard rotation of the motor rotor. Rotation of the rotor causes its conductor bars to cut flux produced by the 120 cycle current component flowing through the control winding and this also produces a current in the rotor conductor bars which quickly acts to expend the force urging the rotor to rotation, as previously mentioned.

The amount of braking action exerted on the motor by the D. C. and 120 cycle current components flowing through the control winding $g'$ is determined by the magnitudes of these components. As explained in said prior Wild application, such braking action may be increased or decreased by varying the amounts of said components in various ways, as, for example, by connecting other power amplifier tubes in parallel with the power amplifier tubes $f$ and $f'$ so as to supply an increased amount of D. C. current and 120 cycle current to the control winding, or by selecting other types of tubes to provide additional D. C. current flow and 120 cycle current flow through the control winding $g'$. In said prior application it is also explained that the amount of braking action may be increased or decreased by respectively decreasing or increasing the biasing resistance between the cathodes and control grids of the valves $f$ and $f'$. In said prior application, it is noted, that if the resistance value of the biasing resistance is decreased too much, the plate current flow through the power amplifier tubes will be increased to a value inconsistent with long tube life and a compromise selection of the biasing resistance value is required, with the result that the braking increase obtainable by decreasing the biasing resistance must be limited to insure adequately long tube life.

With or without the use of the above mentioned expedients described in said Wild application for increasing the inherent braking action of a motor and associated valves like the motor G and valves $f$ and $f'$ shown in Fig. 1, that motor has the inherent self-braking action, previously explained, effective to stop the motor rotation when the system comes into balance and the motor drive signal, previously impressed on the control grids of the valves $f$ and $f'$, dies out. As will be apparent, however, the braking action obtained by injecting a braking signal into the voltage amplifying and motor drive system in accordance with the present invention supplements the effect of the inherent self braking action and ordinarily makes it unnecessary to employ special expedients for augmenting said self-braking action. Furthermore, and more importantly in most cases, the present invention provides a desirable anticipatory braking action which is not inherent in prior systems of the general type described. That anticipatory braking action is applied, and can only be applied, prior to the attainment of complete balance, and momentarily delays the completion of the movement of the motor required to return the system to its fully balanced condition. Furthermore, as has been explained, such retardation not only insures against motor overtravel, but is effected in a manner which does not prevent or unduly delay the full extent of motor movement required for complete balance, and which leaves the balanced system with full sensitivity to initiate an appropriate rebalancing adjustment immediately on the development of a new condition of unbalance.

The transformer secondary winding sections 46 and 47 are so wound that the voltage appearing across the winding 46 is 180° out of phase with the voltage appearing across the winding 47. The voltage appearing across the secondary winding 46 is impressed on the circuit including the diode $d$ and the resistance 53, in series with the transformer primary voltage which is impressed on said circuit through the condenser 48 connected to the connected ends of the secondary windings 46 and 47. Similarly, the primary voltage is superimposed on the voltage impressed by the secondary winding section 47 on the circuit including the diode $d'$ and the resistance 54. When the system frequency has its normal or balance value, the secondary voltage applied to the diode $d$ leads the primary voltage by 90°, while the secondary voltage applied to the diode $d'$ lags the primary voltage by 90°. The absolute values of the primary and secondary voltages in relation to each other are not critical and may be selected as desired.

The phase relation of the voltages appearing across the secondary windings 46 and 47, and the manner in which the potential drops in the resistances 53 and 54 vary under varying conditions, are explained in detail in said prior Wild application. It seems sufficient to note herein, that when the frequency of the high frequency currents supplied to the discriminator D is the balance frequency, the potentials of the discriminator terminals 50 and 51 are equal; and when the frequency of the high frequency currents applied to the discriminator is higher than the balance frequency, the terminal 50 is positive with respect to the terminal 51. Similarly, when the frequency of the high frequency currents applied to the discriminator is lower than the balance frequency, the terminal 51 is positive with respect to the terminal 50. These relationships apply only during the half cycles of the supply voltage frequency which allow the valve $c$ to conduct current.

When the system is unbalanced and is not close to its balanced condition, the signal impressed on the valve $e$ depends entirely upon the relative values of the voltages across the resistances 53 and 54. When balance is closely approached, however, the signal impressed on the valve $e$ depends upon the relative values of the voltages across the resistances 53 and 54 and of the damping signal impressed on the resistance 28 by the control valve P. The voltages across the resistances 53 and 54 are substantially 180° out of phase with one another and the damping signal is substantially 180° out of phase with whichever of the voltages across the resistances 53 and 54 is larger.

When the extent of system unbalance is great enough so that there is no damping signal, the motor drive signal impressed on the valve $e$ is equal in magnitude to the resultant of the opposing voltages across the resistors 53 and 54, and is of the same phase as the larger of the two voltages. When the extent of system unbalance becomes so small that a damping signal is transmitted to the discriminator by the valve P, the signal then impressed on the valve $e$ is the resultant of three voltages, namely the voltages across the resistances 53 and 54 and the voltage across the resistance 28 due to the damping signal. If the voltage across the resistance 28 is smaller than the resultant of the voltages across resistances 53 and 54, as will usually be the case, the effect of the damping signal is to reduce the magnitude of the signal impressed on the valve $e$ without altering the phase of that signal. If the voltage across the resistance 28 is greater than the resultant of the voltages across the resistances 53 and 54, as may sometimes be the case, the phase of the signal impressed on the valve $e$ will be that of the damping signal.

In every case, the motor drive signal impressed on the valve $e$ tends to cause the motor G to turn with a speed proportional to the magnitude of the signal and in the direction required to rebalance the system and thereby eliminate the motor drive signal. In each case, the effect of superimposing the braking signal on the motor drive signal is a sudden decrease in the speed of the motor G. A first effect of the reduction in motor speed is to decrease or eliminate the braking signal being fed back into the amplifying and motor drive network. A second effect of the reduction in speed of the motor is to lower the rate of the increase previously occurring in the positive voltage across the resistor 15 and thereby hasten the return of the valve P to its normal, non-conductive condition.

The form of our invention shown in Fig. 1 is a practically desirable one, but various features of the apparatus shown in Fig. 1 may be omitted or varied with little or no change in the general operative results. Thus, for example, the apparatus shown in Fig. 1 may be simplified, as is illustrated in Fig. 12, by the omission of the high frequency amplifier L and by the omission of the diode O, from apparatus which does not differ substantially in other respects from that shown in Fig. 1. The elements A, C, D, E and F, and other circuit components, not shown in Fig. 12, may be identical with the correspondingly designated elements of Fig. 1.

In Fig. 12, the ungrounded end of the tuned circuit M and the anode of the valve N are connected by a condenser 69 to the source A of the high frequency oscillation by the conductor 1. The connected terminals of the differentiating condenser 16 and resistance 17 of Fig. 12 are directly connected to the control grid of the triode control valve P. The cathode of the valve P is connected through bias resistances 70 and 71 to ground and is connected through the resistance 70 and resistances 72 and 25 to the anode of the valve P. Condensers 73 and 74 are connected in parallel to the resistances 71 and 72, respectively.

Positive voltage is impressed on the plate circuit of the valve P through a connection from the connected ends of the resistances 72 and 25 to the positive conductor 7 from the rectifier valve I, not shown in Fig. 12. A damping signal is derived from the motor drive signal in Fig. 12 by a connection between the output circuit of the motor drive circuit F and the input circuit of the valve P. As shown, said connection comprises the conductor 23', the condenser 20, and the resistance 22 which connect the control grid of the valve P to the motor control winding $g'$, not shown. While the omission of the diode O does not prevent the apparatus shown in Fig. 12 from operating generally as does the apparatus shown in Fig. 1, it is attended by one disadvantage. That disadvantage arises from the previously noted fact that the diode O when present, precludes the application of a strong negative pulse to the control grid of the tube P which when applied to that control grid in the absence of the diode O, would diminish the effectiveness of a positive pulse applied to that grid very shortly thereafter.

In apparatus of the general character shown in Fig. 1, and in the modification thereof, shown in Fig. 12, the damping signal derived from the motor drive signal need not be taken from the conductor 23 connecting the motor drive circuit F to the control winding $g'$ of the motor G as is done in Figs. 1 and 12, but may be taken from any convenient point in the path along which the motor drive signal passes to and through the electronic amplifying and power drive section of the system, provided that the correct phase relationships are maintained. Thus, as is shown by way of example in Fig. 13, the damping signal may be impressed on the control grid of the control valve P through a condenser 80 and a suitable phase reversing transformer 81, which connect said control grid to the ungrounded discriminator terminal 50. For satisfactory operation, it is necessary to feed back the braking signal into the motor drive input rather than into the input of the amplifier valve e. To this end, the resistance 28 of Fig. 1 is eliminated in Fig. 13, and the anode of the valve P is connected through the condenser 26, the resistance 27, and a conductor 82 to an adjustable slider contact 60' which engages the resistance 60.

We believe we were the first to provide a self-balancing system of the general type disclosed in said prior Wills and Wild applications, with means for deriving an alternating current motor damping signal from the motor drive signal and for amplifying that damping signal and feeding it back into the voltage amplifier and motor drive section of the system to reduce or reverse thereby the motor drive signal controlling the operation of the rebalancing motor, to the end of retarding the completion of the final portion of the rebalancing operation.

In practice, the injection of the damping signal into the amplifying section at the proper time requires the use of some means, which we may designate "balance anticipating means" for determining when system balance is being closely approached. The tuned circuit element M and associated differentiating network disclosed herein, constitute a form of balance anticipating means well adapted for use in a system in which the attainment of balance means the attainment of a particular oscillation frequency, but the balance anticipating means may take other forms. Thus, for example, each of the concurrently filed applications of Rudolf F. Wild, one of the applicants herein, Serial No. 678,256 and Serial No. 678,258, discloses a different form of balance anticipating means employed to determine the time at which to inject a braking signal, in accordance with the present invention, into an input portion of the electronic amplifying and motor drive section of a self-balancing system. The self-balancing system shown in each of said concurrently filed applications is a potentiometric self-balancing measuring and control system generally similar to that embodied in the above mentioned commercial instrument, and disclosed in said prior Wills application. In one of said concurrently filed applications, the balance anticipating means is directly responsive to the presence or absence of a specially produced high frequency signal superimposed on the low frequency motor drive signal which will or will not appear in the output circuit of the electronic amplifying and motor drive section of the system, depending on the nearness of the approach of the system to its fully balanced condition.

In the second of said concurrently filed applications, the balance anticipating means is in the form of frequency discriminating means, operable to detect the presence of the hereinbefore mentioned currents with frequencies double that of the normal motor driving current, which develop in the output circuit of an amplifying and motor drive section of the type disclosed herein, as balance is closely approached.

Other subject matter disclosed but not claimed herein is disclosed and is being claimed in the concurrently filed applications of Jack A. Caldwell, Serial No. 678,394, and Herbert A. Clarke, Serial No. 678,254.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. A self-balancing measuring and control system comprising means operable, when said system is balanced, to unbalance the latter, rebalancing mechanism, an electronic amplifying and motor drive section, means responsive to unbalance in said system for impressing on said section, for amplification therein, an alternating current motor drive signal selectively dependent in phase and magnitude on the direction and extent of unbalance, a reversible electric rebalancing motor operatively connected to said section for operation in accordance with the phase and magnitude of said signal to adjust said mechanism as required to rebalance said system, normally inoperative motor damping means adapted when operative to produce a damping signal of a phase opposite to that of the motor drive signal and to feed said damping signal into said section, and balance anticipating means for rendering said damping means operative when said system approaches its balanced condition.

2. A self-balancing measuring and control system comprising means operable to unbalance said system, rebalancing mechanism, an electronic amplifying and motor drive section, means responsive to unbalance in said system for impressing on said section, for amplification therein, an alternating current motor drive signal selectively dependent in magnitude and phase on the extent and direction of unbalance, a reversible electric rebalancing motor operatively connected to said section for operation in accordance with the phase and magnitude of said signal to effect a rebalancing adjustment of said mechanism, balance anticipating means, and motor damping means actuated by said anticipating means to derive a damping signal of opposite phase from the motor drive signal and to feed said damping signal into said electronic section when said system closely approaches its balanced condition.

3. A self-balancing measuring and control system comprising means operable, when said system is balanced, to unbalance the latter, rebalancing mechanism including an electric motor, an electronic amplifying and motor drive section, means responsive to unbalance in said system for impressing on said section, for amplification therein, a motor drive signal adapted selectively to drive said motor as required to rebalance said system, normally inoperative motor damping means adapted when operative to produce a damping signal adapted to counteract the action of said motor drive signal on said motor and to feed said damping signal into said section, and balance anticipating means for rendering said damping means operative when said system approaches its balanced condition.

4. The combination in a self-balancing system of a section for producing an unbalance voltage in response to a system unbalance, an electronic amplifier section, a motor drive section, a motor section including a motor and coupled to said last mentioned section and responsive to unbalance voltages for rebalancing said system, motor braking means including a degenerative feedback circuit connected between two of said sections and normally non-conductive, and balance anticipating means for rendering said feedback circuit conductive as said system approaches balance, thereby to effect a braking action on said motor.

5. The combination of claim 4 wherein said braking means produces said braking action on said motor only when said system approaches balance.

6. The combination of claim 4 wherein said feedback circuit is rendered conductive as said system approaches balance, and is rendered nonconductive when said system is in balance.

7. A self-balancing measuring and control system comprising means operable to unbalance said system, rebalancing mechanism, an electronic amplifying and motor drive section, means responsive to unbalance in said system for impressing on said section, for amplification therein, an alternating current motor drive signal selectively dependent in magnitude and phase on the extent and direction of system unbalance, a reversible electric rebalancing motor operatively connected to said section for operation in accordance with the phase and magnitude of said signal to effect a rebalancing adjustment of said mechanism, a degenerative feedback circuit comprising an electron discharge device having an anode, a cathode, and a control electrode and biased to cut-off, means for connecting said section to the control electrode of said electron discharge device, a condenser through which the anode of said electron discharge device is connected to said section, and means responsive to the approach of said system to its balanced condition for raising the potential of said control electrode relative to the cathode of said electron discharge device to make the latter conductive.

8. A self-balancing measuring and control system comprising means operable to unbalance said system, rebalancing mechanism, an electronic amplifying and motor drive section, means responsive to unbalance in said system for impressing on said section, for amplification therein, an alternating current motor drive signal selectively dependent in magnitude and phase on the extent and direction of system unbalance, a reversible electric rebalancing motor operatively connected to said section for operation in accordance with the phase and magnitude of said signal to effect a rebalancing adjustment of said mechanism, an electron discharge device having an anode, a cathode, and a control electrode and biased to cut-off, means connecting said section to the control electrode of said electron discharge device for impressing on the latter a damping signal opposite in phase to the motor drive signal, means for connecting the anode of said electron discharge device to said section to feed back into the latter the damping signal amplified by said electron discharge device, and balance anticipating means for momentarily increasing the potential of said control electrode relative to the cathode of said electron discharge device as said system approaches its balanced condition.

9. In a self-balancing system, the combination with an electronic amplifying and motor drive section, means responsive to unbalance of said system for impressing on said section an alternating current motor drive signal dependent in magnitude and phase on the extent and direction of system unbalance, and a reversible motor operated through said electronic section in accordance with the magnitude and phase of said signal, of motor damping means comprising a degenerative feed back circuit including an electron discharge device having an anode, a cathode, and a control electrode, biased to cut-off, and having input and output circuits separately connected to said section, and balance anticipating means varying the relative potentials of the control electrode and cathode of said electron discharge device to make the latter conductive when said system approaches its balanced condition.

10. The combination in a self-balancing system of an electronic amplifying and motor drive network, means responsive to unbalance of said system for impressing on said network an alternating current motor drive signal having a magnitude and phase respectively dependent on the magnitude and direction of system unbalance, a rebalancing motor normally operated by said network in accordance with the magnitude and phase of said signal, and motor damping mechanism comprising an electron discharge device biased to cut-off and adapted when made conductive to impress on said network a damping signal opposite in phase to said motor drive signal, balance anticipating means, and associated means through which said anticipating means makes said electron discharge device momentarily conductive as system balance is approached.

11. The combination in a self-balancing system of an electronic amplifying and motor drive network, means responsive to unbalance of said system for impressing on said network an alternating current motor drive signal having a magnitude and phase respectively dependent on the magnitude and direction of system unbalance, a rebalancing motor normally operated by said network in accordance with the magnitude and phase of said signal, and motor damping mechanism comprising an electron discharge device biased to cut-off and adapted when conductive to impress on said network a damping signal opposite in phase to said motor drive signal, balance anticipating means, and an associated differentiating network through which said anticipating means makes said electron discharge device momentarily conductive as system balance is approached.

12. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device having an anode, a cathode, and a control electrode, biased to cut-off, and adapted when conductive to impress on said network a damping signal opposite in phase to said motor drive signal, balance anticipating means, a first resistor having one of its ends connected to the cathode and having its second end connected to the control electrode of said electron discharge device, a second resistor having one end connected to said cathode, a differentiating condenser connecting the second end of said second resistor to the second end of said first resistor and to said control electrode, and means through which said anticipating means passes current through said second resistor at a rate rapidly increasing as system balance is approached in each rebalancing operation of said motor and in a direction making the second end of said second resistor increasingly positive relative to its end connected to said cathode.

13. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device having an anode, a cathode, and a control electrode, biased to cut-off, and adapted when conductive to impress on said network a damping signal opposite in phase to said motor drive signal, balance anticipating means, a differentiating network, unidirectional current conducting means connected between said network and the control electrode of said electron discharge device, and means through which said anticipating means actuates said network to transmit to said control electrode through said unidirectional current conducting means a voltage pulse momentarily making said electron discharge device conductive as system balance is approached.

14. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device having an anode, a cathode, and a control electrode, biased to cut-off, and adapted when conductive to impress on said network a damping signal opposite in phase to said motor drive signal, balance anticipating means, a first diode having an anode and a cathode, said last mentioned cathode being connected to the control electrode of said electron discharge device, a second diode having an anode and a cathode, a differentiating network comprising a condenser connecting the cathode of said second diode to the anode of said first diode and a resistor connecting the anode of said first diode to the cathode of said electron discharge device, a second resistor connecting the cathode of said electron discharge device to the cathode of said second diode, and means through which said anticipating means causes a pulsating current flow of rapidly increasing magnitude to flow through said first mentioned diode as said system balance is approached.

15. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising a control device adapted when conductive to impress on said network a damping signal opposite in phase to said motor drive signal, balance anticipating means, a differentiating network adapted to produce pulses of opposite polarity as the system approaches and departs from its balanced condition, respectively, and means for transmitting pulses of one polarity only to said control device for rendering the latter conductive as system balance is approached.

16. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device biased to cut-off and adapted when conductive to impress on said network a damping signal opposite in phase to said motor drive signal, a normally non-conductive feedback circuit connecting an output portion of said network to an input portion of said network to superimpose a motor braking signal of opposite phase on said motor drive signal when said feedback circuit is made conductive, and balance anticipating means making said feedback circuit conductive as system balance is approached.

17. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising a normally non-conductive feed back circuit connecting an output portion of said network to an input portion of said network to superimpose a motor braking signal of opposite phase on said motor drive signal when said feedback circuit is made conductive, and balance anticipating means making said feedback circuit conductive as system balancing is approached.

18. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device biased to cut-off and adapted when conductive to impress on said network a damping signal opposite in phase to said motor drive signal, balance anticipating means, and means controlled by said anticipating means for superimposing a braking signal of opposite phase on the motor drive signal as system balance is approached.

19. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device biased to cut-off and adapted when conductive to impress on said network a damping signal opposite in phase to said motor drive signal, balance anticipating means, and means controlled by said anticipating means for superimposing a braking signal of opposite phase on the motor drive signal as system balance is approached, said braking signal being proportional in magnitude to said motor drive signal.

20. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal to adjust said system toward its balanced condition, and motor damping mechanism comprising an electron discharge device biased to cut-off and adapted when conductive to impress on said network a damping signal opposite in phase to said motor drive signal, balance anticipating means, and motor damping means controlled by said anticipating means and responsive to the speed at which said system is adjusted toward its balanced condition for superimposing on the motor drive signal a braking signal which is proportional in magnitude and opposite in phase to said motor drive signal when said system approaches its balanced condition, and which diminishes in magnitude as said balanced condition is approached.

21. The combination in a self-balancing system of an electronic amplifying and motor drive network, means responsive to unbalance of said system for impressing an alternating current motor drive signal on said network with a magnitude and phase respectively dependent on the magnitude and direction of system unbalance, a rebalancing motor normally operated by said network in accordance with the magnitude and phase of said signal, and motor damping mechanism comprising an electron discharge device biased to cutoff and adapted when conductive to impress on said network a damping signal opposite in phase to said motor drive signal, balance anticipating means, and motor damping means comprising a normally non-conductive feedback circuit for deriving a braking signal proportional in magnitude and opposite in phase to the motor drive signal from one portion of said network and for passing said braking signal into another portion of said network, and means controlled by said balance anticipating means for making said feedback circuit conductive when said system approaches balance.

22. In a control system, the combination of apparatus including tuning means subject to detuning and retuning adjustment for generating an oscillating signal of a normal and relatively high frequency, or of greater or lesser frequencies depending on said adjustments, means responsive to variations in said frequency from its normal value, a reversible retuning motor set into operation by said responsive means when said frequency varies from its normal value to effect an adjustment of said tuning means in the direction and to the extent required to restore said frequency to its normal value, and means responsive to the approach of said frequency to its normal value and including differentiating means responsive to the rate of change of said frequency for subjecting said motor to a temporary braking effect which is reduced substantially to zero as said frequency reaches its normal value.

23. In a control system, the combination of apparatus including tuning means subject to detuning and retuning adjustment for generating an oscillating signal of a normal and relatively high frequency, or of greater or lesser frequencies depending on said adjustments, means responsive to variations in said frequency from its normal value, a reversible retuning motor set into operation by said responsive means when said frequency varies from its normal value to effect an adjustment of said tuning means in the direction and to the extent required to restore said frequency to its normal value, and means comprising a circuit tuned to resonance for current flow therethrough of said normal frequency and including differentiating means responsive to the rate of change of said frequency and operating on the approach of said frequency to its normal value to subject said motor to a temporary braking effect which is reduced substantially to zero as said frequency reaches its normal value.

24. In a control system, the combination of apparatus including tuning means subject to detuning and retuning adjustment for generating an oscillating signal of a normal and relatively high frequency, or of greater or lesser frequencies depending on said adjustments, means responsive to variations in said frequency from its normal value, a reversible retuning motor set into operation by said responsive means when said frequency varies from its normal value to effect an adjustment of said tuning means in the direction and to the extent required to restore said frequency to its normal value, and means comprising a circuit tuned to resonance for current flow therethrough of the normal frequency and a network including a pair of resistors each connected at one end to one end of the other, a coupling condenser connecting the other ends of said resistors, and means through which said tuned circuit effects a rapid increase in the voltage across one of said resistors and thereby effects a still more rapid increase in the voltage across the second resistor as said frequency approaches its normal value in each retuning operation of said motor, and motor braking means actuated by the rapid increase in the voltage across said second resistor.

25. In a control system, the combination of apparatus including tuning means subject to detuning and retuning adjustment for generating an oscillating signal of a normal and relatively high frequency, or of greater or lesser frequencies depending on said adjustments, means responsive to variations in said frequency from its normal value, a reversible retuning motor set into operation by said responsive means when said frequency varies from its normal value to effect an adjustment of said tuning means in the direction and to the extent required to restore said frequency to its normal value, and means comprising a tuned circuit resonant at said normal frequency and coupled to said tuning means, rectifying means coupled to said tuned circuit, a network connected to said rectifying means for differentiating the output of said last mentioned means, and braking means coupled to said differentiating network for applying a braking action to said motor in accordance with the output of said differentiating network.

26. In a control system, the combination of apparatus including tuning means subject to detuning and retuning adjustments for generating an oscillating signal of a normal and relatively high frequency, or of greater or lesser frequencies depending on said adjustments, means responsive to variations in said frequency from its normal value, a reversible retuning motor set into operation by said responsive means when said frequency varies from its normal value to effect an adjustment of said tuning means in the direction and to the extent required to restore said frequency to its normal value, and means comprising an electron discharge device having an anode, a cathode, and a control electrode, means transmitting said oscillating signal to the control electrode of said electron discharge device, and means including an inductance and condenser connected in the output circuit of said electron discharge device and forming a circuit tuned to resonance for current flow therethrough of said normal frequency, said last mentioned means also including differentiating means responsive to the rate of change of said frequency and operating on the approach of said frequency to its normal value in each retuning operation of said motor to subject the latter to a temporary braking effect which is reduced substantially to zero as said frequency reaches its normal value.

27. In a self-balancing system, the combination with an electronic amplifying and motor drive section, means responsive to unbalance of said system for impressing on said section an alternating current motor drive signal dependent in magnitude and phase on the extent and direction of system unbalance, and a reversible motor operated through said electronic section in accordance with the magnitude and phase of said signal, of motor damping means comprising a degenerative feedback circuit including an electron discharge device having an anode, a cathode, and a control electrode, biased to cut-off, and having input and output circuits separately connected to said section, and balance anticipating means varying the relative potentials of the control electrode and cathode of said electron discharge device to make the latter conductive when said system approaches its balanced condition, the connection between said output circuit and said section including a condenser and an isolation resistance.

28. A self-balancing measuring and control system comprising means operable, when said system is balanced, to unbalance the latter, rebalancing mechanism, an electronic amplifying and motor drive section, means responsive to unbalance in said system for impressing on said section, for amplification therein, an alternating current motor drive signal selectively dependent in magnitude and phase on the extent and direction of system unbalance, a reversible electric rebalancing motor operatively connected to said section for operation in accordance with the phase and magnitude of said signal to effect a rebalancing adjustment of said mechanism, an electron discharge device having an input circuit and an output circuit and biased to cut-off, means for passing motor drive signal current from said section to said input circuit, a connection from said output circuit to said section for feeding the signal current amplified in said electron discharge device into said section, and balance anticipating means adapted to make said electron discharge device conductive as said system approaches its balanced condition.

RUDOLF F. WILD.
LLOYD B. CHERRY.

REFERENCES CITED

The following references are of record in the file of this patent:

UNITED STATES PATENTS

| Number | Name | Date |
| --- | --- | --- |
| 2,280,019 | Alexanderson et al. | Apr. 14, 1942 |